United States Patent [19]

Aagesen

[11] 3,808,632
[45] May 7, 1974

[54] VEHICLE MOUNTABLE AREA CLEANER

[76] Inventor: Elvin A. Aagesen, 2491 W. Evans, Denver, Colo.

[22] Filed: Dec. 13, 1971

[21] Appl. No.: 207,094

[52] U.S. Cl. ................................... 15/340, 15/416
[51] Int. Cl. .............................................. A47l 5/00
[58] Field of Search ........................ 15/83, 340, 416

[56] References Cited
UNITED STATES PATENTS

| | | | |
|---|---|---|---|
| 3,406,424 | 10/1968 | Rush | 15/340 |
| 3,006,021 | 10/1961 | Patch | 15/340 |
| 3,384,920 | 5/1968 | Campbell | 15/340 |
| 2,973,544 | 3/1961 | Romaniuk | 15/340 |
| 2,631,314 | 3/1953 | Fitzpatrick | 15/83 |
| 2,663,894 | 12/1953 | Elliotte | 15/340 |
| 3,708,823 | 1/1973 | Bell | 15/340 |

FOREIGN PATENTS OR APPLICATIONS 1,216,342  5/1966  Germany ............................ 15/340

Primary Examiner—Billy J. Wilhite
Assistant Examiner—C. K. Moore
Attorney, Agent, or Firm—James E. Pittenger

[57] ABSTRACT

An area cleaner, mountable on the front of a wheeled vehicle, includes a rotary brush sweeper and a blower arranged to pick up dirt and trash by suction, both units being driven from the vehicle engine drive shaft. Picked up trash and dirt is pneumatically conveyed to a container mounted on the vehicle.

10 Claims, 6 Drawing Figures

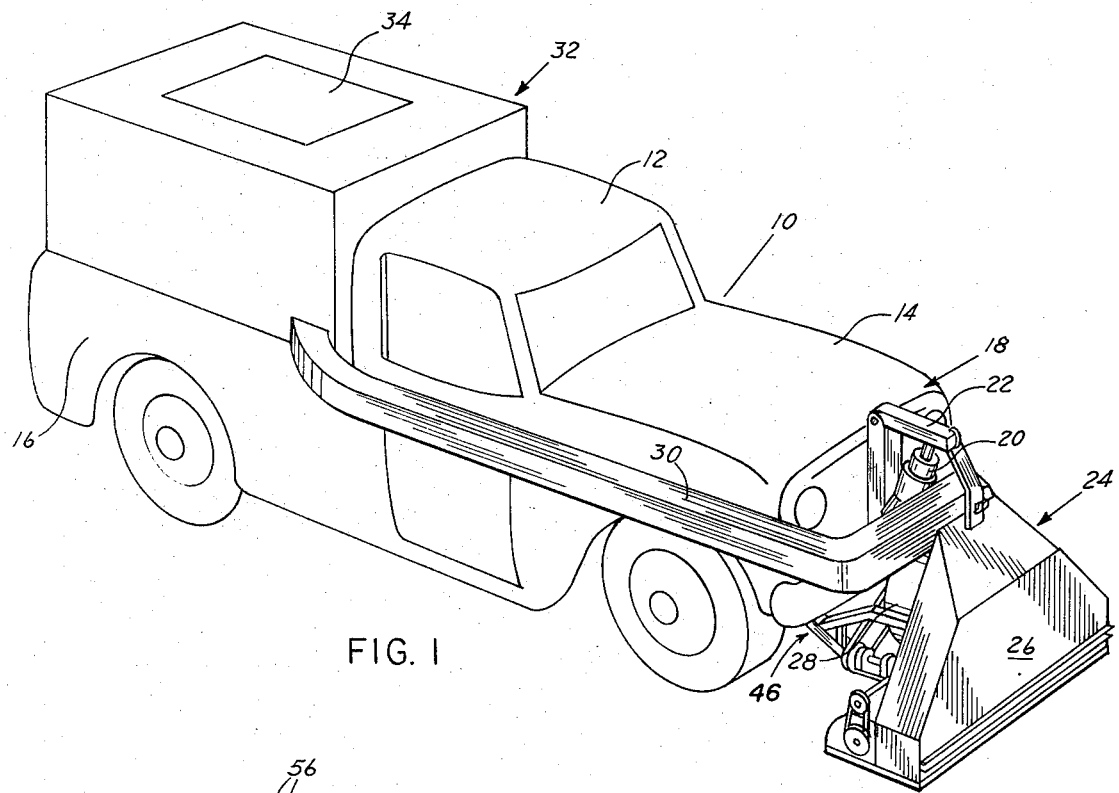
FIG. 1
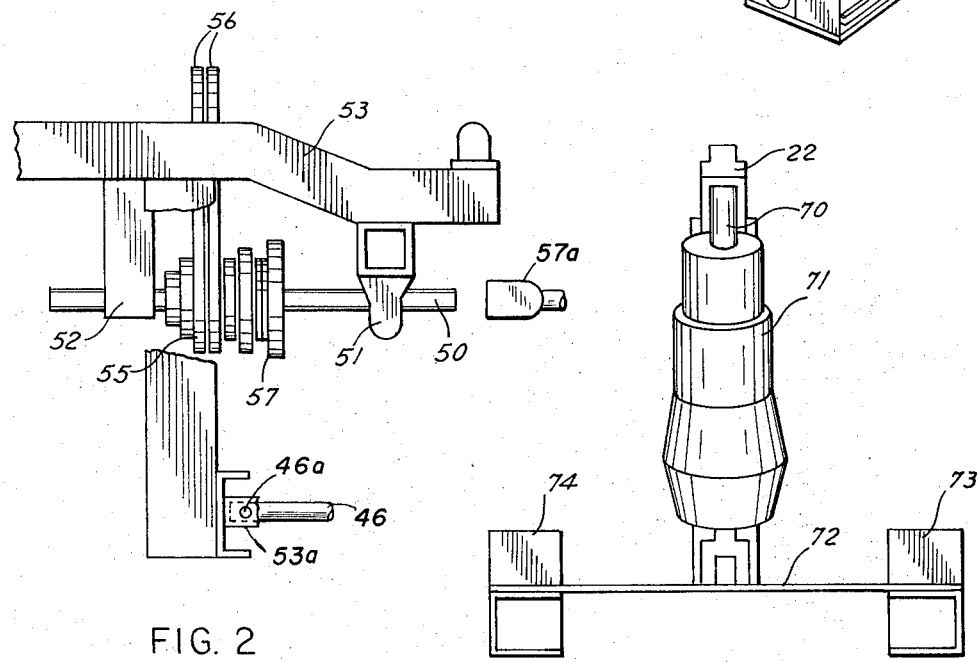
FIG. 2
FIG. 3
INVENTOR
ELVIN A. AAGESEN
BY
Richard H. Law
ATTORNEY

VEHICLE MOUNTABLE AREA CLEANER

The maintenance of relatively small areas, particularly those used by wheeled vehicles, such as parking lots, parking areas for shopping centers, streets of small towns or villages, or the like, and pedestrian walking areas, is rapidly becoming a headache for those responsible for such maintenance. The cleaning of such areas has increasingly become an expensive problem. Equipment for cleaning such areas must be more than mere brooms and dustpans because of time limitations, as well as economic limitations in capital expenses and manpower. In shopping centers, for example, cleaning the parking areas involves an operation during non-busy hours (usually late at night or early morning) and at all seasons of the year. The clean-up includes trash pickup, fallen leaves, snow, etc. Heretofore, two complete vehicles were required for most of the cleaning maintenance operations; one vehicle to pick up trash, and another vehicle to push the snow from the parking areas and carry small equipment. The latter vehicle was usually a pick-up truck. This, of course, requires a substantial capital investment in equipment, the necessity of storage space and vehicle maintenance. Further, the infrequent use of the seasonal equipment tends to exaggerate the per hour in use cost.

According to the present invention there is provided an area cleaner which may be mounted on the front end of a small truck, but may be quickly demounted permitting the use of the truck for other purposes. The unit is arranged to be mounted on a standard front end lifting jack for such vehicles, and the power equipment of the cleaner is arranged to be driven by the drive shaft of the vehicle engine and some belt drives. Debris pick up by the cleaner passes through the blower, along a pneumatic line to a container carried by the vehicle. The cleaner unit is provided with a rotary brush which loosens trash and dirt and injects it into the air stream going through the blower and subsequently into the container. One side of the head of the cleaning unit is arranged with a side vent for cleaning against curbs, walls, or the like.

Included among the objects and advantages of the present invention is an area cleaner which is arranged to be attached to standard attachments on a wheeled vehicle.

Another object of the invention is to provide an area cleaner attachable to a wheeled vehicle and which utilizes the engine of the vehicle to drive a blower and a rotary brush.

A further object of the invention is to provide an area cleaner which includes a side vent on the head for cleaning against curbs and walls and the like.

A still further object of the invention is to provide a demountable area cleaner which is economically built and economically operated from a standard wheeled vehicle such as a pickup truck or the like.

A further object of the invention is to provide a quickly demountable area cleaner from a standard wheeled vehicle which permits multiple use of the wheeled vehicle with minimum time of change of equipment.

These and other objects and advantages of the invention may be readily ascertained by referring to the following description and appended illustrations in which:

FIG. 1 is a perspective view of an area cleaner, according to the invention, mounted on a pickup truck which is provided with a trash container in the bed of the pickup truck;

FIG. 2 is a side elevational view of a detail of the drive unit of the cleaner according to the invention;

FIG. 3 is a front elevational view of a lift unit mounted on the front end of a vehicle for attachment to the area cleaner according to the invention;

FIG. 6 is an end elevational detail of a side vent for the suction head of the area cleaner for cleaning against curbs, walls, or the like.

Figure 4:
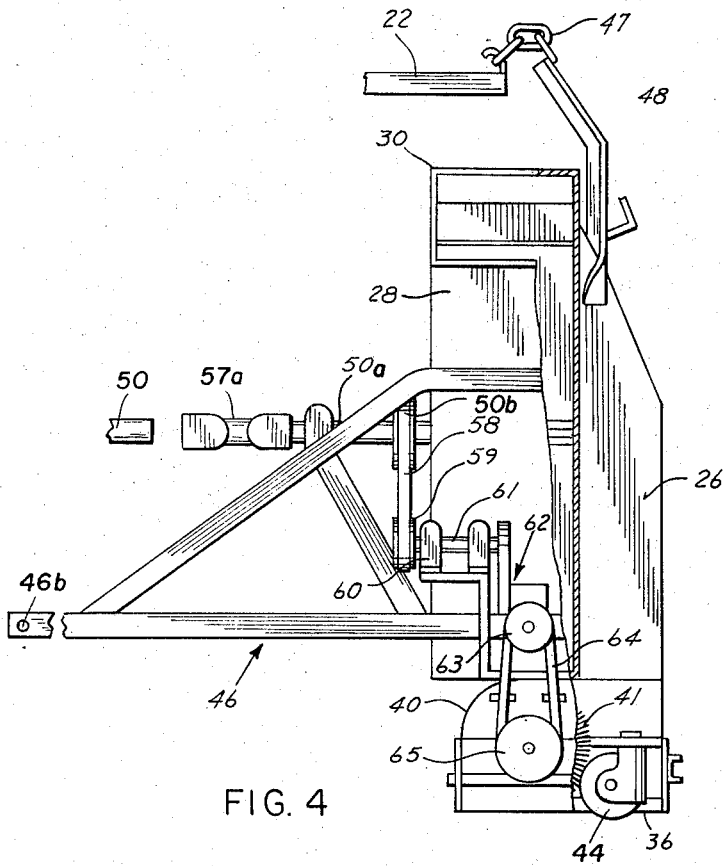
FIG. 4 is a side elevational view of the cleaning unit of the invention.

In the overall view shown in FIG. 1, a pickup truck, shown in general by numeral 10 includes a driver's cab 12, an engine 14 and a pickup bed 16, all of which are essentially conventional in this particular type of vehicle. A hydraulic lifter unit shown in general by numeral 18 is secured to the front of the engine in conventional manner, being braced against the bumper braces and providing a hydraulic cylinder 20 for raising a lifter arm 22, which is, also, conventional. An area cleaner attachment, shown in general by numeral 24, is attached to the front of the vehicle which includes a hood 26, a blower 28 and a pneumatic tube 30. The blower pulls air from around the bottom of the hood 26, drawing dirt and trash through the blower and exhausts it through pneumatic tube 30 into a trash container, shown in general by numeral 32, mounted on the bed 16 of the pickup truck. A filter element 34 in the container permits the exhaust of air but retaining trash and dirt blown into the container 32.

Figure 6:
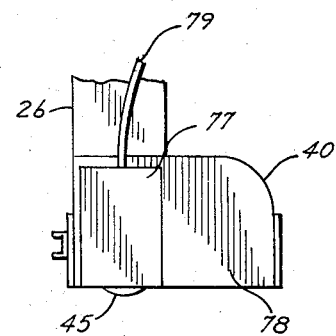
Figure 5:
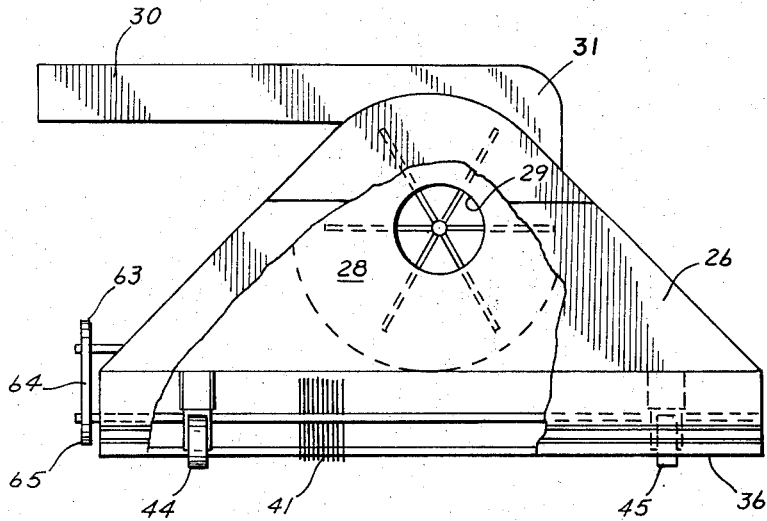
FIG. 5 is a front elevational view of the area cleaning unit according to the invention partially cut away and omitting the mounting arm, illustrating the positioning of various members in the cleaning unit.

The details of the area cleaner are shown in FIGS. 4 through 6, wherein the hood 26 is mounted adjacent the blower 28. The hood is longitudinally thin, but laterally wide providing a wide mouth 36. The hood terminates in a small upper end forming an essentially triangularly shaped hood. The hood 26 at its upper end communicates with an outlet 29, which is, also, the inlet of the blower 28. A tangential outlet 31 from the blower exhausts into the pneumatic tube 30. An arcuate lower housing 40 is secured to and extends along the back side of the mouth 36 of the hood, and it encloses a rotary brush 41. Caster wheels 44 and 45, of adjustable height, support the area cleaner on the surface of the area to be cleaned and prevent it from dragging on the surface of the area. A rubber or other flexible member may be secured to the housing 40 for riding on the ground.

A frame shown in general by numeral 46 is attached to the back of the hood 26 at one end and to the vehicle frame at the other end. Two such frames are used, only one being shown. The connection of the frame with the vehicle is by pivot pins 46a passing through holes 46b formed in the ends of the framework 46 so that the unit may be raised and pivoted about the pivot pins 46a. The unit is raised and lowered by means of the movable arm 22 which may be connected by means of a chain 47 to a lifter arm 48 attached to the hood 26. The connector for the pivot pin 46a is preferably a standard connector 53a such as a U-shaped bracket attached to the truck and used with equipment which is mounted on the truck front, e.g. a snow plow.

The blower 28 and the brush 41 are driven from a common shaft 50 which is mounted on bearing journals 51 and 52 which are secured to frame 53 of the vehicle. A pair of pulleys 55 mounted on the shaft 50 are driven by a pair of V-belts 56 which are reeved over pulleys mounted on the crankshaft of the vehicle in front of the fan belt pulley. A clutch 57 is provided on the shaft 50 so that the blower 28 and brush 41 can be rotated when desired. A universal joint 57a is provided on the shaft 50a and is arranged to slidably receive the end of shaft 50. The universal joint 57a permits relative bending between the shafts 50 and 50a and allows for quick coupling of the drive shafts. The shaft 50a drives the blower directly. A pulley 50b is mounted on the shaft 50a near the drive end. A belt 58 passes over a pulley 59 mounted in the journal system 60. Shaft 61 of the journal system is attached to a variable speed gear box, shown in general by numeral 62, which in turn drives a pulley 63, and by means of belt 64, and the pulley 65 of the brush. The gear box 62 provides means for controlling the speed of the brush, and preferably it is a conventional variable speed gear reducer. Any of the common gear type speed reducers which permit manual changing of the gear ratios is suitable for use in this invention.

The arm 22 is mounted on a piston rod 70, FIG. 3, which is actuated by cylinder 71, which is in turn pivotally mounted on a frame 72 mounted between upper brackets 73 and 74 of the pickup vehicle, which is conventional to the particular type of lift. Actuation of the cylinder 71 extends or retracts the rod 70 and thereby raises and lowers the unit. As pointed out above the unit is attached by pivot pins with the frame 46 to a lower frame portion on the vehicle. The hydraulic lift is usually associated with a blade or other similar standard equipment for the front end of the vehicle. When such a blade is used it is attached by means of pivot pins to a rearwardly extending frame from the blade to the vehicle frame or axle of the vehicle. The unit of the invention is arranged with its frame to match the pivot points of the conventional frame of the lifter unit.

The side cleaning arrangement for gutters, along walls or the like is illustrated in FIG. 6, wherein a vent door 77 is mounted in slides on side 78 covering the end of housing 40 and the hood 26. A sheath push-pull cable 79 permits the door 77 to be raised or lowered as desired by the operator of the vehicle. The unit may be run closely to the gutter wall with the vent open, cleaning the gutter.

The hood 26 is made to extend just slightly beyond the side of the vehicle so that it may be used for cleaning close to a wall or a curb without danger of any portion of the vehicle striking the wall. Where the unit is to be used in several locations, the hood is made of a width to conform to the width limits of vehicles as established by local traffic laws. Furthermore, the frame 46 is easily adjusted to fit the type and model of vehicle on which it is to be used, whether it is a two-wheel drive or four-wheel drive vehicle. The connection with the lifter arm may, also, be easily adjusted to fit the vehicle on which the area cleaner is to be used. The pneumatic tube is, likewise, adjustable to any vehicle, so that the unit is universally adapted to the type of vehicle on which it is to be used. The connection of the unit to the vehicle is a 3-point connection including the two lower pivotal connections and the upper connection on the lifter arm. The drive is very easily disassembled by breaking the universal joint and removing the drive belts from the pulley on the crankshaft. The quick mounting and dismounting of the unit from the vehicle permits the vehicle to be used for other purposes where the cleaning unit is used rather infrequently.

The unit is useful for sweeping up leaves and debris from the ground, lawns and the like, particularly large areas such as golf courses, etc. For this purpose the unit may be carried slightly higher than when used on concrete. Also, the brush 41 may be replaced by a rake, which is in effect a brush with stiff tines. The rate of rotation is adjusted to the desired pickup.

I claim:

1. A surface area cleaning assembly for mounting on the front end of a pickup truck or the like having a forward mounted drive engine, the cleaning assembly comprising
   a. a laterally elongated hood having a lower narrow mouth inlet extending beyond the width of the truck and converging to an upper, smaller area outlet,
   b. mounting means for pivotally connecting the hood transversely to the front end of said truck so that the narrow mouth of the hood is held generally parallel to the surface area to be cleaned and is capable of being selectively raised or lowered with respect to said surface;
   c. blower means having an inlet and outlet, said blower means being mounted on said hood with the inlet of said blower means communicating with the outlet of the hood,
   d. rotary brush means mounted adjacent to the rear edge of said narrow mouth and arranged to rotate around an axis parallel to said surface,
   e. drive means connected to the front end of the crank shaft of said truck engine and arranged for rotating said blower means and said brush means whereby trash lying on said surface will be disturbed and picked up through said narrow mouth by the airflow created by said blower means, and
   f. trash container means mounted on said truck having a pneumatic tube means connected between said trash container means and the outlet of said blower means whereby the trash picked up by said blower means will be conveyed to said container means.

2. An area cleaning assembly according to claim 1 wherein said hood is of generally triangular shape.

3. An area cleaning assembly according to claim 2 wherein said blower inlet is in the apex of said triangular shaped hood.

4. An area cleaning assembly according to claim 1 wherein said hood includes caster wheels for riding on the surface for, holding said hood in a predetermined distance above the surface.

5. An area cleaning assembly according to claim 1 wherein one end of said hood includes a door, selectively openable for cleaning gutter, corners or the like.

6. An area cleaning assembly according to claim 1 wherein said drive means includes a variable speed drive means connected to said brush means whereby the rotative speed of said brush means can be variably controlled.

7. An area cleaning assembly according to claim 1 wherein said assembly is further characterized by a dust filter connected to said trash container means to retain dust and said trash therein but permit exhaust of the air from said blower.

8. An area cleaning assembly according to claim 1 wherein said rotary brush means is mounted in a housing contiguous with the rear portion of said hood whereby said brush contacts said surface for moving the trash into said narrow mouth.

9. An area cleaning assembly according to claim 1 wherein said mounting means includes a pair of rearwardly extending mounting arms for pivotally connecting the hood to conventional snow blade mounts provided on said truck.

10. An area cleaning assembly according to claim 1 wherein said mounting means and said drive means further includes detachable means for quickly and easily connecting and disconnecting the assembly to said truck.

* * * * *